(12) United States Patent
Kashima

(10) Patent No.: US 7,079,207 B2
(45) Date of Patent: Jul. 18, 2006

(54) LIQUID CRYSTAL DISPLAY

(75) Inventor: Keiji Kashima, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 63 days.

(21) Appl. No.: 10/288,235

(22) Filed: Nov. 4, 2002

(65) Prior Publication Data

US 2003/0160924 A1 Aug. 28, 2003

(30) Foreign Application Priority Data

Nov. 6, 2001 (JP) ............................. 2001-340602

(51) Int. Cl.
*G02F 1/1335* (2006.01)
(52) U.S. Cl. .......................... 349/115; 349/98; 349/106
(58) Field of Classification Search ................. 349/98, 349/105, 194, 114, 106, 115
See application file for complete search history.

(56) References Cited

U.S. PATENT DOCUMENTS

| | | | | |
|---|---|---|---|---|
| 5,555,114 A | * | 9/1996 | Narita et al. ................... | 349/98 |
| 5,734,457 A | * | 3/1998 | Mitsui et al. ................ | 349/106 |
| 5,841,494 A | * | 11/1998 | Hall ............................ | 349/98 |
| 6,147,734 A | * | 11/2000 | Kashima ..................... | 349/113 |
| 6,160,595 A | * | 12/2000 | Kishimoto .................... | 349/61 |
| 6,177,216 B1 | * | 1/2001 | Broer et al. ................... | 430/7 |
| 6,333,773 B1 | * | 12/2001 | Faris ........................ | 349/176 |
| 6,552,767 B1 | * | 4/2003 | Kaneko ....................... | 349/119 |
| 6,597,418 B1 | * | 7/2003 | Moon et al. ................... | 349/98 |
| 6,621,543 B1 | * | 9/2003 | Moon ......................... | 349/115 |
| 6,727,967 B1 | * | 4/2004 | Nakamura et al. .......... | 349/114 |
| 6,747,717 B1 | * | 6/2004 | Moon ......................... | 349/97 |

FOREIGN PATENT DOCUMENTS

| | | |
|---|---|---|
| JP | 8-234196 | 9/1996 |
| JP | 8-320480 | 12/1996 |
| JP | 9-318807 | 12/1997 |
| JP | 2000-131684 | 5/2000 |
| JP | 2000-193962 | 7/2000 |
| JP | 2000-347179 | 12/2000 |
| JP | 2001-4843 | 1/2001 |

* cited by examiner

*Primary Examiner*—Huyen Ngo
(74) *Attorney, Agent, or Firm*—Dellett & Walters

(57) ABSTRACT

A liquid crystal display improves light utilization efficiency with a cholesteric liquid crystal filter to ensure color density enough to enable both transmission and reflection type displays. The display comprises a liquid crystal display device comprising a liquid crystal layer between transparent substrates, a voltage applying electrode, a driving circuit, an illumination light source, and a pair of circularly polarizing plates. A cholesteric liquid crystal filter semitransparent to red, green and blue wavelength ranges is located on the illumination light-directing side. The liquid crystal layer viewing side has a cholesteric liquid crystal color filter array capable of transmitting red, green and blue wavelength ranges and reflecting light in other wavelength ranges depending on a pixel arrangement, and absorption type color filter array is located in alignment therewith and capable of transmitting only red, green and blue wavelength ranges and absorbing light in other wavelengths.

5 Claims, 3 Drawing Sheets

LIQUID CRYSTAL DISPLAY

BACKGROUND OF THE INVENTION

The present invention relates generally to a liquid crystal display, and more particularly to a liquid crystal display capable of presenting a transmission type display using a backlight and a reflection type display using ambient light.

For instance, JP-A 9-318807 discloses to use a cholestric liquid crystal-dispersed cholesteric film as a color filter. This color filter is superior in luminance and color purity to conventional color filters using pigments or dyes. Another advantage of the color filter is that by use of a ultraviolet curing type cholesteric liquid crystal in which the wavelength of its selectively reflected light changes with temperature and a chiral agent ratio and which can be cured by ultraviolet irradiation while its liquid crystal state is maintained, it can be fabricated more easily as compared with the prior art.

Such a cholesteric liquid crystal as mentioned above, and a chiral nematic liquid crystal is characterized by having a long-range order of liquid crystal molecule axis as well as a spatially helically varying a director. In a plane parallel with the liquid crystal molecule axis, namely the liquid crystal has an orientational order similar to that of a nematic phase. In the adjacent plane, however, this local orientational direction is slightly rotated. This successively occurs, giving a helical structure.

On the other hand, natural light may be broken down into dextrorotatory polarization and levorotatory polarization. The chloresteric or chiral nematic liquid crystal has such properties that when both dextrorotatory component light and levorotatory component light are incident parallel with the helical axis of the liquid crystal, only circularly polarized light in the same rotatory direction as the twist direction of that liquid crystal is reflected thereat whereas the other circularly polarized light component passes therethrough.

Since there is then no change in the phase of the reflected light with respect to the incident light, the direction of polarization of the reflected light before and after reflection is kept invariable, and the wavelength of the reflected light changes with the twist pitch of the cholesteric or chiral nematic liquid crystal. This pitch changes with the amount of the chiral agent added, which induces twist force in the liquid crystal, and suitable external fields (e.g., temperature, electric, magnetic or other fields).

By control of such parameters as mentioned above in the visible region, it is thus possible to form red, green and blue transmitted light and reflect light other than the transmitted light toward a light source side for reuse, thereby setting luminance at a level higher than could be achieved with a conventional color filter.

By the way, JP-A's 8-320480, 8-234196 and 2000-347179 show a transmission type color liquid crystal display wherein R (red), G (green) and B (blue) pixels are provided on the backlight side with a cholesteric liquid crystal filter that transmits light in the R, G and B wavelength ranges and reflects light in other wavelength ranges, and on the viewing side with an absorption type color filter that transmits only light in the R, G and B wavelength ranges and absorbs light in other wavelength ranges, thereby improving on the efficiency of use of backlight and eliminating influences of ambient light.

Further, JP-A 2000-193962 discloses an arrangement wherein a semitransparent type cholesteric liquid crystal filter, i.e., a semitransparent type cholesteric liquid crystal filter designed to transmit a specific proportion, e.g., 10%, rather than 100%, of specific circularly polarized light in a specific wavelength range is located on the side of the liquid crystal layer of a liquid crystal display device opposite to the viewing side, so that for a reflection type display, a specific circularly polarized light component of ambient light is reflected at this semitransparent type cholesteric liquid crystal filter, and for a transmission type display, for instance, just 10% of a specific circularly polarized light component of backlight are transmitted therethrough. On the other hand, JP-A 2001-4843 discloses that such a semitransparent type cholesteric liquid crystal filter is constructed of a triple-layer cholesteric liquid crystal filter arrangement for reflecting light in the R, G and B wavelength ranges at a given proportion.

Furthermore, JP-A 2000-131684 discloses an arrangement wherein color filters of the absorption type are located on both the viewing side and the backlight side of the liquid crystal layer of a liquid crystal display device with a cholesteric liquid crystal filter interposed between the backlight side-color filter of the absorption type and the liquid crystal layer, so that whether for reflection type display purposes or for transmission type display purposes, illumination light is transmitted twice through the absorption type of color filters, thereby ensuring enough color density in either case.

SUMMARY OF THE INVENTION

In view of such situations as explained with reference to the prior art, the primary object of the present invention is to provide a liquid crystal display in which the efficiency of utilization of light is improved by use of a cholesteric liquid crystal filter thereby ensuring color density enough to enable both the transmission type display and the reflection type display.

According to the first aspect of the present invention, this object is achieved by the provision of a liquid crystal display, comprising a liquid crystal display device comprising a liquid crystal layer sandwiched between two transparent substrates for modulation of a phase of incident light depending on an applied voltage, and an electrode and a driving circuit for applying a voltage to the liquid crystal layer independently for each pixel, an illumination light source that faces away a viewing side of the liquid crystal display device, a circularly polarizing plate interposed between the illumination light source and the liquid crystal display device, and a circularly polarizing plate located on the viewing side of the liquid crystal display device, characterized in that:

said liquid crystal layer is provided on its illumination light-directing side with a cholesteric liquid crystal filter of the type semi-transparent to light in all red, green and blue wavelength ranges, and said liquid crystal layer is provided on the viewing side with an array form of cholesteric liquid crystal color filter that is capable of transmitting only light in the red, green and blue wavelength ranges and reflecting light in other wavelength ranges depending on a pixel arrangement, and an array form of absorption type color filter that is located in alignment with its viewing side to transmit only light in the red, green and blue wavelength ranges and absorb light in other wavelength ranges.

Preferably in this case, an array form of second absorption type color filter that is capable of transmitting only light in the red, green and blue wavelength ranges and absorbing light in other wavelength ranges is located in alignment with the illumination light-directing side of said array form of cholesteric liquid crystal color filter.

The second aspect of the present invention provides a liquid crystal display, comprising a liquid crystal display device comprising a liquid crystal layer sandwiched between two transparent substrates for modulation of a phase of incident light depending on an applied voltage, and an electrode and a driving circuit for applying a voltage to the liquid crystal layer independently for each pixel, an illumination light source that faces away a viewing side of the liquid crystal display device, a circularly polarizing plate interposed between the illumination light source and the liquid crystal display device, and a circularly polarizing plate located on the viewing side of the liquid crystal display device, characterized in that:

said liquid crystal layer is provided on its illumination light-directing side with, in order from the illumination light-directing side, a cholesteric liquid crystal filter of the type semitransparent to light in all red, green and blue wavelength ranges, an array form of cholesteric liquid crystal color filter that is capable of transmitting only light in the red, green and blue wavelength ranges and reflecting light in other wavelength ranges depending on a pixel arrangement, and an array form of absorption type color filter that is located in alignment therewith to transmit only light in the red, green and blue wavelength ranges and absorb light in other wavelength ranges.

The third aspect of the present invention provides a liquid crystal display, comprising a liquid crystal display device comprising a liquid crystal layer sandwiched between two transparent substrates for modulation of a phase of incident light depending on an applied voltage, and an electrode and a driving circuit for applying a voltage to the liquid crystal layer independently for each pixel, an illumination light source that faces away a viewing side of the liquid crystal display device, a circularly polarizing plate interposed between the illumination light source and the liquid crystal display device, and a circularly polarizing plate located on the viewing side of the liquid crystal display device, characterized in that:

said liquid crystal layer is provided on its illumination light-directing side with an array form of first absorption type color filter that is capable of transmitting only light in red, green and blue wavelength ranges and absorbing light in other wavelength ranges depending on a pixel arrangement and a cholesteric liquid crystal filter that is located on its viewing side and is of the type semitransparent to light in all the red, green and blue wavelength ranges, and said liquid crystal layer is provided on its viewing side with an array form of second absorption type color filter that is capable of transmitting only light in the red, green and blue wavelength ranges and absorbing light in other wavelength ranges depending on the pixel arrangement.

Preferably in this case, the first absorption type color filter located on the illumination light-directing side of said liquid crystal layer is provided on its illumination light-directing side with an array form of cholesteric liquid crystal color filter that is located in alignment therewith and is capable of transmitting only light in the red, green and blue wavelength ranges and reflecting light in other wavelength ranges.

Throughout the aforesaid arrangements, it is desired that the circularly polarizing plate located on the side of the illumination light source is designed to reflect light having a polarization property opposite to that of a transmitted light component from the illumination light source.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

Some embodiments of the liquid crystal display according to the present invention are now explained with reference to the accompanying drawings.

Figure 1:
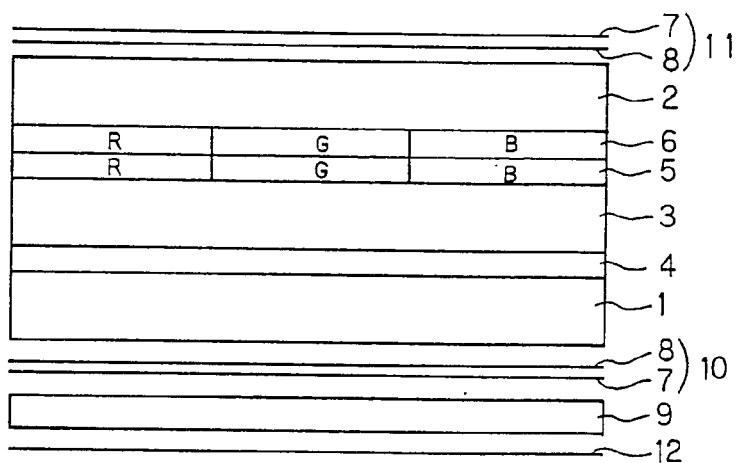
FIG. 1 is illustrative in section of the construction of one embodiment of the color liquid crystal display according to the present invention.

FIG. 1 is illustrative in section of the construction of one embodiment of the color liquid crystal display according to the present invention.

In this color liquid crystal display as shown in FIG. 1, a liquid crystal layer 3 is sandwiched between glass substrates 1 and 2. The substrate 1 on a backlight side is provided on its inside surface with a cholesteric liquid filter 4 of the type semitransparent to light in all R (red), G (green) and B (blue) wavelength ranges, and the opposite substrate 2 is provided on its inside surface with an array form of absorption type color filter 6 that, depending on an pixel arrangement, transmits only light in the R, G and B wavelength ranges and absorbs light in other wavelength ranges and an array form of cholesteric liquid crystal color filter 5 that is located in alignment therewith to transmit only the light in the R, G and B wavelength ranges and reflect light in other wavelength ranges in such a way that the absorption type color filter 6 is located on the viewing side.

It is here noted that an R pixel of the cholesteric liquid crystal color filter 5, for instance, is constructed by superposition of a cholesteric liquid crystal filter element that reflects light in the G wavelength range on a chloresteric liquid crystal filter element that reflects light in the B wavelength range (JP-A 8-234196). The same holds true for the G, and B pixel.

The cholesteric liquid crystal filter 4 of the type semitransparent to light in all the R, G and B wavelength ranges is constructed by superposition of a cholesteric liquid crystal filter element that reflects light in the R wavelength range at a reflectivity of less than 100%, a cholesteric liquid crystal filter element that reflects light in the G wavelength range at a reflectivity of less than 100% and a cholesteric liquid crystal filter element that reflects light in the B wavelength range at a reflectivity of less than 100% (JP-A 2001-4843).

Referring back to FIG. 1, a circularly polarizing plate 10 comprising a linearly polarizing plate 7 and a quarter-wavelength plate 8 is located on the entrance side of the glass substrate 1 on the backlight side, a circularly polarizing plate 11 comprising a quarter-wavelength plate 8 and a linearly polarizing plate 7 is located on the viewing side of the glass substrate 2 on the viewing side, and an illumination light source 9 and a reflecting plate 12 for the same are located on the entrance side of the circularly polarizing plate 10. Although not illustrated, the glass substrates 1 and 2 are provided on their inside surfaces with pixel electrodes, opposite electrodes, TFTs (TFDs), etc. in alignment with the pixels of the filters 5 and 6. It is noted that the TFTs (TFDs) should preferably be located on the inside surface of the substrate 1 on the backlight side, although they may be provided on either inside surface of the substrate 1, and 2, because the intensity of the reflection type arrangement in particular becomes strong.

It is noted that instead of the circularly polarizing plate 10, it is acceptable to use a circularly polarizing separation film comprising three or more film layers having birefringence with a quarter-wavelength plate stacked thereon, as set forth typically in JP-A 2000-347179.

Referring here to the transmission type display, illumination light comprising natural polarization, leaving the light source 9, arrives at the circularly polarizing plate 10. A circular polarization component of the illumination light, which coincides with the reflective properties of the semitransparent type cholesteric liquid crystal filter 4, for instance, only a right-handed circular polarization component thereof transmits through the polarizing plate 10 whereas the opposite circular polymerization component is absorbed therein. For instance, white light of right-handed circular polarization passing through the circularly polarizing plate 10 transmits at a given proportion of, e.g., just 50% through the semitransparent cholesteric liquid crystal filter 4, arriving at the liquid crystal layer 3. Then, the white light passes through the liquid crystal layer 3 while it is kept in the right-handed circular polarization state or converted into left-handed circular polarization depending on the modulated state of pixels, arriving at the cholesteric liquid crystal filter 5. Referring here to the R, G and B filter elements of the cholesteric liquid crystal filter 5, which have the property of reflecting the left-handed circular polarization component as is the case with the semi-transparent type cholesteric liquid crystal filter 4, the white light, which has passed through the liquid crystal layer 3 in the right-handed circular polarization state, passes through the cholesteric liquid crystal filter 5 in such a way that light in the R, G and B wavelength ranges passes through the R, G and B filter elements of the cholesteric liquid crystal filter 5, and light in other wavelength ranges is reflected thereat, with the reflected light going back to the side of the light source 9 through the cholesteric liquid crystal filter 4 and then the circularly polarizing plate 10. The light of right-handed circular polarization passed through the R, G and B filter elements of the cholesteric liquid crystal filter 5 transmits through the R, G and B filters of the absorption type color filter 6, leaving the circularly polarizing plate 11 and appearing in the form of linearly polarized light on the viewing side, presenting displays in a bright state.

The light converted through the liquid crystal layer 3 into left-handed circular polarization transmits through the cholesteric liquid crystal filter 5, and arrives at the circularly polarizing plate 11 through the R, G and B filter elements of the absorption type color filter 6. At this circularly polarizing plate 11, that light is cut off, presenting displays in a dark state, because it is the left-handed circular polarization opposite to the circular polarization that passes through the polarizing plate 11.

It is understood that the light going back to the side of the light source 9 can be used as the illumination light upon being reflected and scattered at the reflecting plate 12 or the like, thereby improving on the efficiency of utilization of backlight and making bright displays possible.

Referring then to the reflection type display that makes use of ambient light, the light is converted through the circularly polarizing plate 11 into right-handed circular polarization. Upon passing through the absorption type color filter 6, light in wavelength ranges other than those corresponding to the R, G and B filter elements is absorbed therein. Light of right-handed circular polarization in the R, G and B wavelength ranges transmits through the R, G and B filter elements of the cholesteric liquid crystal filter 5. When that light transmits through the liquid crystal layer 3 in the right-handed circular polarization state, just 50% are reflected at the semitransparent type cholesteric liquid crystal filter 4, and transmits again through the liquid crystal layer 3, the chloresteric liquid crystal filter 5 and the absorption type color filter 6, leaving the circularly polarizing plate 11 and appearing in the form of linearly polarized light on the viewing side, presenting displays in the bright state.

When the light is converted through the liquid crystal layer 3 into left-handed circular polarization, it arrives at the circularly polarizing plate 10 through the semitransparent type cholesteric liquid crystal filter 4. At this circularly polarizing plate 10, however, that light is cut off, presenting displays in the dark state, because it is the left-handed circular polarization opposite to the circular polarization that passes through the polarizing plate 10.

In conjunction with this embodiment, it is noted that when the absorption type color filter 6 is not located, color reproducibility becomes worse and faithful displays become impossible because the chloresteric liquid crystal filter 5 serves to reflect a circular polarization component that is in the wavelength range of the corresponding color of ambient light and has the property of being reflected.

Figure 2:
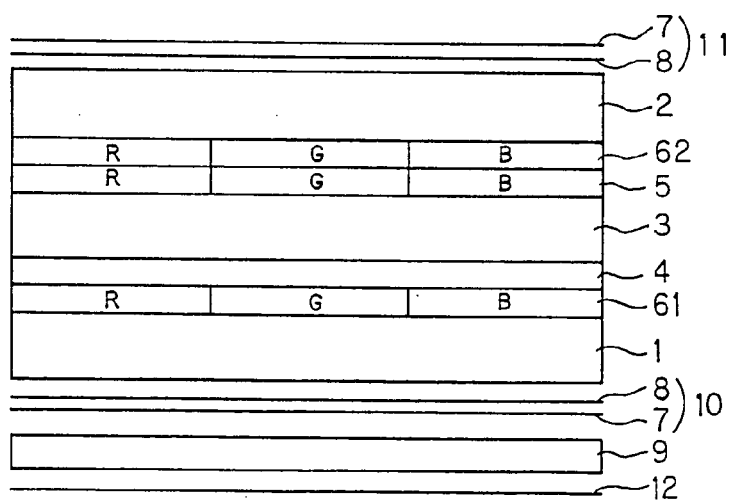
FIG. 2 is illustrative in section of the construction of one modification to the color liquid crystal display shown in FIG. 1.

FIG. 2 is illustrative in section of one modification to the color liquid crystal display shown in FIG. 1. This embodiment is different in construction from the embodiment of FIG. 1 in that a second absorption type color filter 62 is used in place of the array form of absorption type color filter 6, and an array form of first absorption type color filter 61 is located on the semitransparent cholesteric liquid crystal filter 4. Referring to the transmission type, illumination light transmits through the two absorption type color filters 61 and 62, and referring to the reflection type, illumination light transmits twice through the absorption type color filter 61. Thus, whether for reflection type display purposes or for transmission type display purposes, illumination light is transmitted twice through the absorption type of color filters, thereby ensuring enough color density in either case.

Figure 3:
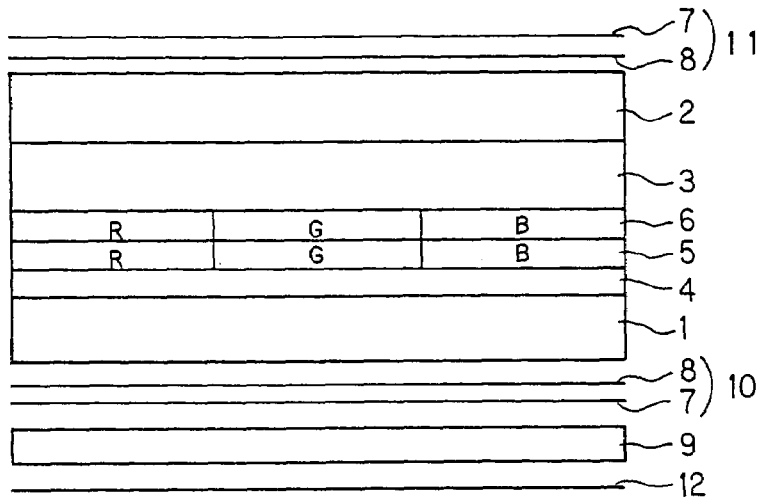
FIG. 3 is illustrative in section of the construction of another modification to the color liquid crystal display shown in FIG. 1.

FIG. 3 is illustrative in section of another modification to the color liquid crystal display shown in FIG. 1. This embodiment is different in construction from that of FIG. 1 in that the array form of absorption type color filter 6 and the cholesteric liquid crystal color filter 5 are stacked on the semitransparent type cholesteric liquid crystal filter 4 of the substrate 1 on the backlight side.

Referring here to the transmission type display, illumination light comprising natural polarization, leaving the light source 9, arrives at the circularly polarizing plate 10. A circular polarization component of the illumination light, which coincides with the reflective properties of the semi-transparent type cholesteric liquid crystal filter 4, for instance, only a right-handed circular polarization component thereof transmits through the polarizing plate 10 whereas the opposite circular polymerization component is absorbed therein. For instance, white light of right-handed circular polarization passing through the circularly polarizing plate 10 transmits at a proportion of, e.g., just 50% through the semitransparent cholesteric liquid crystal filter 4, arriving at the cholesteric liquid crystal filter 5. Then, light in the R, G and B wavelength ranges passes through the R, G and B filter elements of the cholesteric liquid crystal filter 5 while light in wavelength ranges other than the R, G and B wavelength ranges is reflected thereat, with the reflected light going back to the side of the light source 9 through the cholesteric liquid crystal filter 4 and then the circularly polarizing plate 10.

Light in the R, G and B wavelength ranges, which has passed through the R, G and B filter elements of the cholesteric liquid crystal filter 5, arrives at the liquid crystal layer 3 through the respective R, G and B filter elements of the absorption type color filter 6, through which the light is kept in the right-handed circular polarization state or converted into left-handed circular polarization depending on the modulated state of pixels, so that in the case of the right-handed circular polarization, displays are presented by the circularly polarizing plate 11 in a bright state, and in the case of the left-handed circular polarization, displays are presented ion a dark state.

Referring then to the reflection type display that makes use of ambient light, the light is converted through the circularly polarizing plate 11 into right-handed circular polarization. Upon passing through the liquid crystal layer 3 while it is kept in the right-handed circular polarization state, light in wavelength ranges other than those corresponding to the R, G and B filter elements is absorbed therein through the absorption type color filter 6. Light of right-handed circular polarization in the R, G and B wavelength ranges transmits through the R, G and B filter elements of the cholesteric liquid crystal filter 5, so that just 50% are reflected at the semitransparent type cholesteric liquid crystal filter 4, and transmit again through the semitransparent cholesteric liquid crystal filter 5, the absorption type color filter 6 and the liquid crystal layer 3, leaving the circularly polarizing plate 11 and appearing in the form of linearly polarized light on the viewing side so that displays are presented in a bright state. When the ambient light is converted through the liquid crystal layer 3 into left-handed circular polarization, it arrives at the circularly polarizing plate 10 by way of the absorption type color filter 6, the cholesteric liquid crystal filter 5 and the semitransparent cholesteric liquid crystal filter 4. At that circularly polarizing plate 10, the left-handed polarization is cut off to present displays in a dark state because of being opposite to the circular polarization that passes therethrough.

Figure 4:
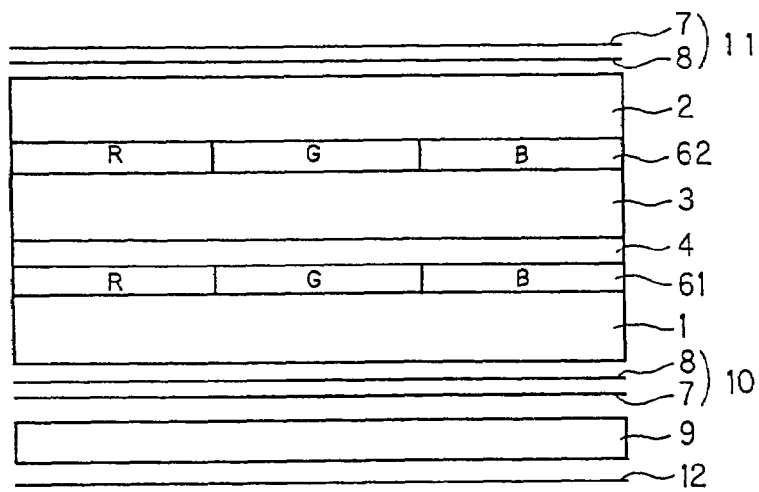
FIG. 4 is illustrative in section of the construction of another embodiment of the color liquid crystal display according to the present invention.

FIG. 4 is illustrative in section of another embodiment of the color liquid crystal display according to the present invention.

In this color liquid crystal display as shown in FIG. 4, a liquid crystal layer 3 is sandwiched between glass substrates 1 and 2. The substrate 1 on a backlight side is provided on its inside surface with an array form of firth absorption type color filter 61 that, depending on a pixel arrangement, transmits only light in R, G and B wavelength ranges and absorbs light in other wavelength ranges and a cholesteric liquid filter 4 of the type semitransparent to light in all the R, G and B wavelength ranges, and the opposite substrate 2 is provided on its inside surface with an array form of second absorption type color filter 62 that, depending on an pixel arrangement, transmits only light in the R, G and B wavelength ranges and absorbs light in other wavelength ranges.

A circularly polarizing plate 10 is located on the entrance side of the glass substrate 1 on the backlight side, a circularly polarizing plate 11 comprising a quarter-wavelength plate 8 and a linearly polarizing plate 7 is located on the viewing side of the glass substrate 2 on the viewing side, and an illumination light source 9 and a reflecting plate 12 for the same are located on the entrance side of the circularly polarizing plate 10. Although not illustrated, the glass substrates 1 and 2 are provided on their inside surfaces with pixel electrodes, opposite electrodes, TFTs (TFDs), etc. in alignment with the pixels of the filters 61 and 62.

Referring here to the transmission type display, illumination light comprising natural polarization, leaving the light source 9, arrives at the circularly polarizing plate 10. A circular polarization component of the illumination light, which coincides with the reflective properties of the semitransparent type cholesteric liquid crystal filter 4, for instance, only the right-handed circular polarization component thereof transmits through the polarizing plate 10 whereas the opposite circular polymerization component, e.g., a left-handed circular polarization component is absorbed therein. For instance, white light of right-handed circular polarization passing through the circularly polarizing plate 10 transmits through the R, G and B filter elements of the first absorption type color filter 61 in such a way that only light of right-handed circular polarization in the R, G and B wavelength ranges arrives at the semitransparent type cholesteric liquid crystal filter 4. For instance, just 50% of that light transmit through the cholesteric liquid crystal filter 4, arriving at the liquid crystal layer 3. Then, the light passes through the liquid crystal layer 3 while it is kept in the right-handed circular polarization state or converted into left-handed circular polarization depending on the modulated state of pixels, arriving at the circularly polarizing plate 11 through the second absorption type color filter 62, so that in the case of right-handed circular polarization, displays are presented in a bright state, and in the case of left-handed circular polarization, displays are presented in a dark state.

The light of right-handed circular polarization in the R, G and B wavelength ranges, reflected at the semitransparent type cholesteric liquid crystal filter 4, goes back to the circularly polarizing plate 10 by way of the first absorption type color filter 61, and then back to the side of the light source 9 therethrough.

It is understood that the light going back to the side of the light source 9 can be used as the illumination light upon reflected and scattered at the reflecting plate 12 or the like, thereby improving on the efficiency of utilization of backlight and making bright displays possible.

Referring then to the reflection type display that makes use of ambient light, the light is converted through the circularly polarizing plate 11 into right-handed circular polarization. Upon passing through the R, G and B filter elements of the second absorption type color filter 62, light of right-handed circular polarization in the R, G and B wavelength ranges arrives at the liquid crystal layer 3. When that light transmits through the liquid crystal layer 3 in the right-handed circular polarization state, just 50% are reflected at the semitransparent type cholesteric liquid crystal filter 4, and transmits again through the liquid crystal layer, leaving the circularly polarizing plate 11 and appearing in the form of linearly polarized light on the viewing side, presenting displays in a bright state. When the light is converted through the liquid crystal layer 3 into left-handed circular polarization, it arrives at the circularly polarizing plate 10 through the semitransparent type cholesteric liquid crystal filter 4 and the first absorption type color filter 61. At this circularly polarizing plate 10, however, that light is cut off, presenting displays in a dark state, because it is the left-handed circular polarization opposite to the circular polarization that passes through the polarizing plate 10.

In this embodiment, whether for the reflection type displaying purposes or for the transmission type displaying purposes, enough color density is ensured because the illumination light transmits twice through the two absorption type color filters 61 and 62.

Figure 5:
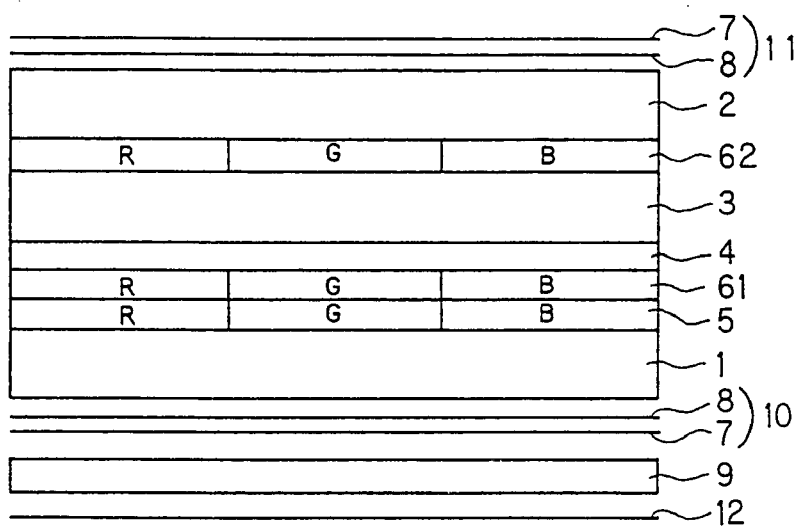
FIG. 5 is illustrative in section of the construction of one modification to the color liquid crystal display shown in FIG. 4.

FIG. 5 is illustrative in section of the construction of one modification to the color liquid crystal display shown in FIG. 4. This modification is different in construction from the embodiment of FIG. 4 in that the first absorption type color filter 61 is provided on its backlight-directing side with an array form of cholesteric liquid crystal color filter 5 in alignment with the first absorption type color filter 61, which color filter 5 transmits only light in the R, G and B wavelength ranges and reflects light in other wavelength range.

Referring to the transmission type display, illumination light of natural polarization, leaving the light source 9, arrives at the circularly polarizing plate 10. A circular polarization component that coincides with the reflective properties of the semitransparent type cholesteric liquid crystal filter 4, for instance, only a right-handed circular polarization component transmits through the circularly polarizing plate 10 whereas the opposite circular polarization component, e.g., a left-handed circular polarization component is absorbed therein. For instance, light of right-handed circular polarization passing through the circularly polarizing plate 10 is incident on the R, G and B filter elements of the chloresteric liquid crystal color filter 5, so that light in the R, G and B wavelength ranges transmits therethrough while light in other wavelength ranges is transmitted thereat, with the reflected light going back to the side of the light source 9 through the circularly polarizing plate 10.

Upon passing through the R, G and B filter elements of the cholesteric liquid crystal color filter 5, the light arrives at the semitransparent type cholesteric liquid crystal filter 4 by way of the R, G and B filter elements of the first absorption type color filter 61, so that just 50% transmit the filter 4, arriving at the liquid crystal layer 3. The transmitted light then arrives at the circularly polarizing plate 11 via the second absorption type color filter 62 while it is kept in the right-handed circular polarization state or converted into left-handed polarization depending the modulated state of pixels, so that in the case of right-handed circular polarization, displays are represented in a bright stage and in the case of left-handed circular polarization, displays are presented in a dark state.

In this embodiment, too, the light going back to the side of the backlight 9 can again be used for illumination light upon reflected and scattered at a reflecting plate 12 or the like, improving on the efficiency of utilization of backlight and making bright displays possible.

Referring then to the reflection type display that makes use of ambient light, the light is converted through the circularly polarizing plate 11 into right-handed circular polarization, and only light of right-handed circular polarization in the R, G and B wavelength ranges arrives at the liquid crystal layer 3 via the R, G and B filter elements of the second absorption type color filter 62. When that light transmits through the liquid crystal layer 3 in the right-handed circular polarization state, just 50% are reflected at the semitransparent type cholesteric liquid crystal filter 4, and transmits again through the liquid crystal layer 3 and the second absorption type color filter 62, leaving the circularly polarizing plate 11 in a linearly polarized polarization form and appearing on the viewing side, presenting displays in a bright state. When the light is converted through the liquid crystal layer 3 into left-handed circular polarization, it arrives at the circularly polarizing plate 10 through the semitransparent type cholesteric liquid crystal filter 4, the first absorption type color filter 61 and the cholesteric liquid crystal color filter 5. At this circularly polarizing plate 10, however, that light is cut off, presenting displays in a dark state, because it is the left-handed circular polarization opposite to the circular polarization that passes through the polarizing plate 10.

In addition to the feature of the embodiment shown in FIG. 4, this embodiment has an additional feature that the efficiency of utilization of backlight is enhanced, because the incident light that is incident on the R, G and B filter elements of the cholesteric liquid crystal color filter 5 and has wavelengths other than the R, G and B wavelengths is allowed to go back to the side of the light source 9.

While, in the aforesaid embodiments, the circularly polarizing plate 10 located on the backlight-directing side serves to absorb and cut one polarization directed from the illumination light source 9, it is understood that the use of the circularly polarizing plate 10 of the type that is capable of reflecting a non-transmittable polarization component gives rise to further improvements in the efficiency of utilization of backlight. If a circular polarization separation film, in which a quarter-wavelength plate is stacked on a circular polarization selection layer that is capable of reflecting one of right-handed and left-handed circular polarizations and transmitting the other, as shown in JP-A 10-232313, is located on the entrance side of a linearly polarizing plate element 7 of the circularly polarizing plate 10, then further improvements in the efficiency of utilization of backlight are achievable even when one of circular polarization components leaving the illumination light source 9 is used for illumination and the other non-transmittable circular polarization component is reflected.

While some embodiments of the liquid crystal display according to the present invention have been described, it is understood that the present invention is not always limited thereto, and so may be modified in various ways.

According to the present invention as explained above, a cholesteric liquid crystal filter of the type semitransparent to light in all the R, G and B wavelength ranges and an array form of cholesteric liquid crystal color filter capable of transmitting only light in the R, G and B wavelength ranges and reflecting light in other wavelength ranges depending on an pixel arrangement can be used to provide a liquid crystal display having an improved efficiency of utilization of backlight and capable of representing both the reflection type displays and the transmission type displays.

What we claim is:

1. A liquid crystal display, comprising a liquid crystal display device comprising a liquid crystal layer sandwiched between two transparent substrates for modulation of a phase of incident light depending on an applied voltage, and an electrode and a driving circuit for applying a voltage to the liquid crystal layer independently for each pixel, an illumination light source that faces away a viewing side of the liquid crystal display device, a circularly polarizing plate interposed between the illumination light source and the liquid crystal display device, and a circularly polarizing plate located on the viewing side of the liquid crystal display device, wherein:

said liquid crystal layer is provided on an illumination source side thereof with a first filter comprising a cholesteric liquid crystal filter of a type semi-transparent to light in all red, green and blue wavelength ranges, and said liquid crystal layer is provided on the viewing side with a second filter comprising an array form of cholesteric liquid crystal color filter that is capable of transmitting only light in the red, green and blue wavelength ranges and reflecting light in other wavelength ranges depending on a pixel arrangement, and a third filter comprising an array form of absorption type color filter that is located in alignment with said second filter at a viewing side thereof to transmit only light in the red, green and blue wavelength ranges and absorb light in other wavelength ranges.

2. The liquid crystal display according to claim 1, wherein the circularly polarizing plate located on a side of said illumination light source is designed to reflect light having a polarization property opposite to that of a transmitted light component from said illumination light source.

3. A liquid crystal display, comprising a liquid crystal display device comprising a liquid crystal layer sandwiched between two transparent substrates for modulation of a phase of incident light depending on an applied voltage, and an electrode and a driving circuit for applying a voltage to the liquid crystal layer independently for each pixel, an illumination light source that faces away a viewing side of the liquid crystal display device, a circularly polarizing plate interposed between the illumination light source and the liquid crystal display device, and a circularly polarizing plate located on the viewing side of the liquid crystal display device, wherein:

said liquid crystal layer is provided on an illumination source side thereof with a first filter comprising a cholesteric liquid crystal filter of a type semi-transparent to light in all red, green and blue wavelength ranges, and said liquid crystal layer is provided on the viewing side with a second filter comprising an array form of cholesteric liquid crystal color filter that is capable of transmitting only light in the red, green and blue wavelength ranges and reflecting light in other wavelength ranges depending on a pixel arrangement, and a third filter comprising an array form of absorption type color filter that is located in alignment with said second filter at a viewing side thereof to transmit only light in the red, green and blue wavelength ranges and absorb light in other wavelength ranges, wherein a fourth filter comprising an array form of absorption type color filter that is capable of transmitting only light in the red, green and blue wavelength ranges and absorbing light in other wavelength ranges is located in alignment with said second filter comprising an array form of cholesteric liquid crystal color filter at an illumination light directing side thereof.

4. A liquid crystal display, comprising a liquid crystal display device comprising a liquid crystal layer sandwiched between two transparent substrates for modulation of a phase of incident light depending on an applied voltage, and an electrode and a driving circuit for applying a voltage to the liquid crystal layer independently for each pixel, an illumination light source that faces a side away from a viewing side of the liquid crystal display device, a circularly polarizing plate interposed between the illumination light source and the liquid crystal display device, and a circularly polarizing plate located on the viewing side of the liquid crystal display device, wherein:

said liquid crystal layer is provided on an illumination light source side thereof with, in order from the illumination light source side, a first filter comprising a cholesteric liquid crystal filter of a type semitransparent to light in all red, green and blue wavelength ranges, a second filter comprising an array form of cholesteric liquid crystal color filter that is capable of transmitting only light in the red, green and blue wavelength ranges and reflecting light in other wavelength ranges depending on a pixel arrangement, and a third filter comprising an array form of absorption type color filter that is located in alignment with said array form of cholesteric liquid crystal color filter that is capable of transmitting, to transmit only light in the red, green and blue wavelength ranges and absorb light in other wavelength ranges.

5. The liquid crystal display according to any one of claims 3 or 4, wherein the circularly polarizing plate located on a side of said illumination light source is designed to reflect light having a polarization property opposite to that of a transmitted light component from said illumination light source.

* * * * *